J. C. BLEDSOE.
COLLAPSIBLE COOP.
APPLICATION FILED SEPT. 9, 1914.
1,161,108.
Patented Nov. 23, 1915.
2 SHEETS—SHEET 1.
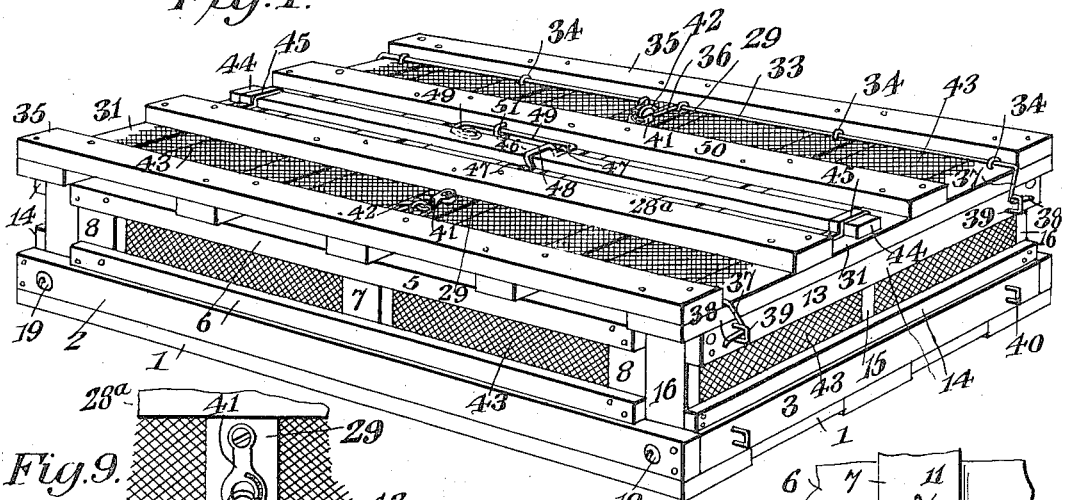
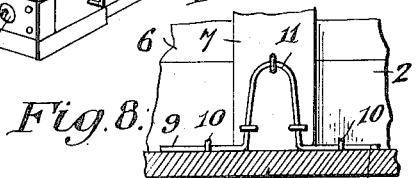
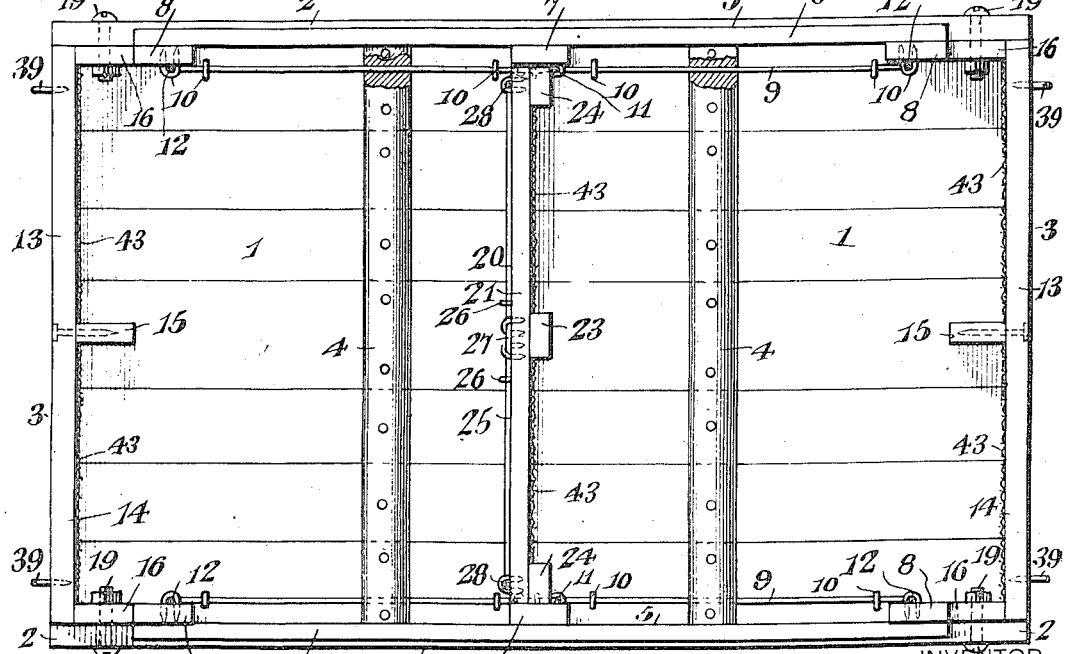
WITNESSES
Jas. K. McCathran
H. H. Riley
INVENTOR
John C. Bledsoe,
BY E. G. Siggers
ATTORNEY J. C. BLEDSOE.
COLLAPSIBLE COOP.
APPLICATION FILED SEPT. 9, 1914.
1,161,108.
Patented Nov. 23, 1915.
2 SHEETS—SHEET 2.
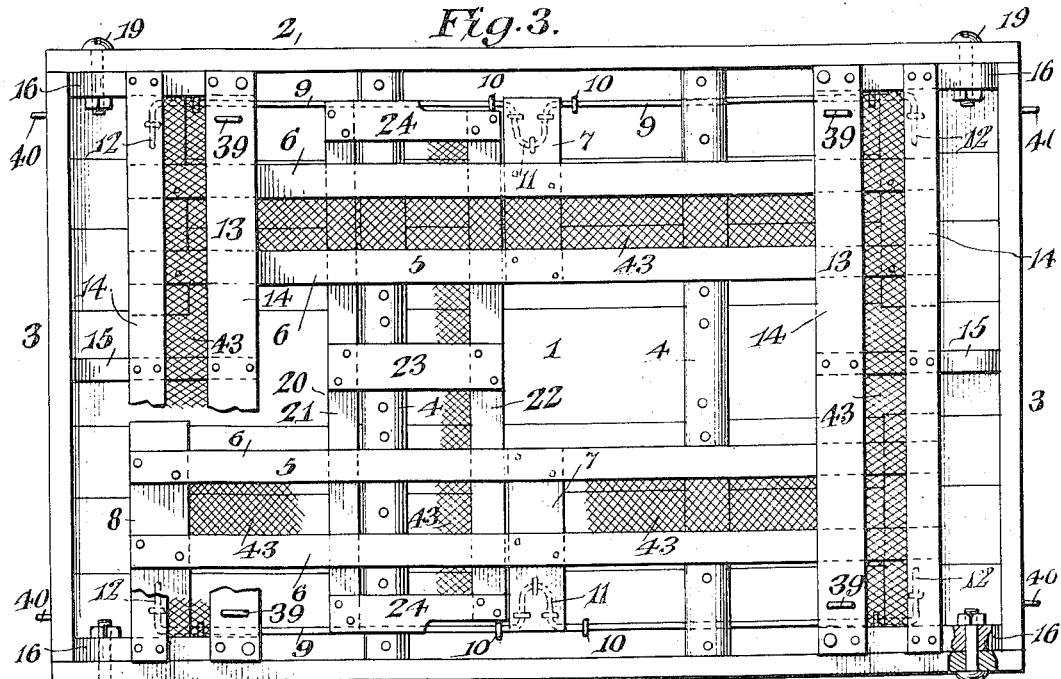
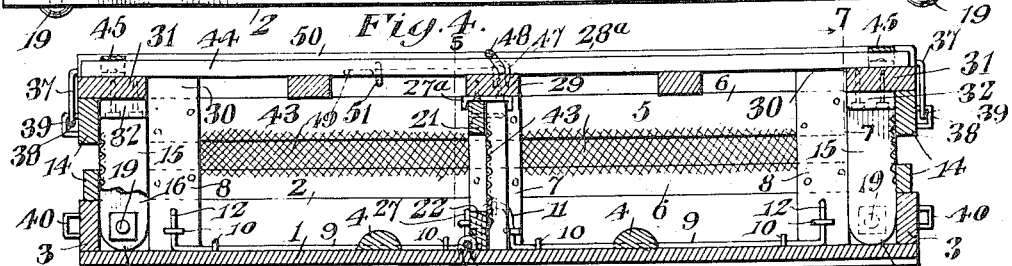
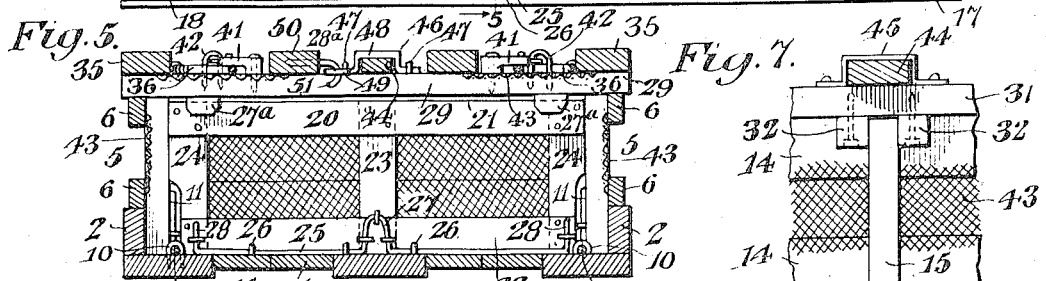
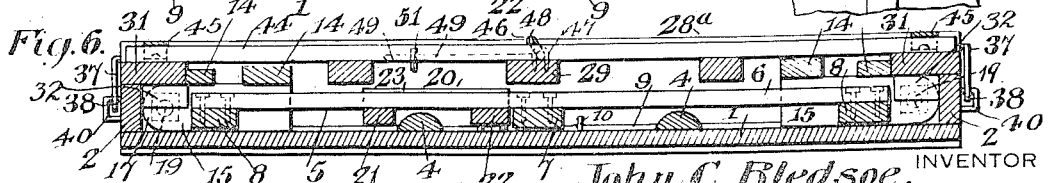
WITNESSES
Jas. K. McEachran
J. J. Riley
INVENTOR
John C. Bledsoe,
BY E. G. Siggers
ATTORNEY

UNITED STATES PATENT OFFICE.

JOHN C. BLEDSOE, OF CLEBURNE, KANSAS.

COLLAPSIBLE COOP.

1,161,108.  Specification of Letters Patent.  Patented Nov. 23, 1915.

Application filed September 9, 1914. Serial No. 860,878.

*To all whom it may concern:*

Be it known that I, JOHN C. BLEDSOE, a citizen of the United States, residing at Cleburne, in the county of Riley and State of Kansas, have invented a new and useful Collapsible Coop, of which the following is a specification.

The invention relates to improvements in collapsible poultry coops.

The object of the present invention is to improve the construction of collapsible shipping crates and poultry coops and to provide a simple, practical, and inexpensive coop, of strong and durable construction, capable of being collapsed into compact form for returning it in an empty condition to the shipper, and adapted, when collapsed, to house and protect the parts, whereby the coop is prevented from being broken or otherwise injured by rough handling during transit.

With these and other objects in view the invention consists in the construction and novel combination of parts hereinafter fully described, illustrated in the accompanying drawing, and pointed out in the claims appended hereto, it being understood that various changes in the form, proportion, size and minor details of construction, within the scope of the claims, may be resorted to without departing from the spirit or sacrificing any of the advantages of the invention.

In the drawings: Figure 1 is a perspective view of a collapsible poultry coop constructed in accordance with this invention arranged for use. Fig. 2 is a plan view of the same, the top or cover being removed and the transverse cleats of the bottom or base being sectioned at one end. Fig. 3 is a plan view of the same, the sides and ends being folded and partly broken away. Fig. 4 is a longitudinal sectional view, taken centrally through the coop, the latter being arranged as shown in Fig. 1. Fig. 5 is a transverse sectional view on the line 5—5 of Fig. 4. Fig. 6 is a longitudinal sectional view taken centrally of the coop, the latter being collapsed. Fig. 7 is a detail sectional view on the line 7—7 of Fig. 4. Fig. 8 is an enlarged detail sectional view showing the central portion of the hinge of an end wall. Fig. 9 is a detail view of the central portion of one of the side locks.

Like numerals of reference designate corresponding parts in all the figures of the drawings.

In the accompanying drawings, in which is illustrated the preferred embodiment of the invention, 1 designates the bottom or base of the coop, provided at its side and end edges with longitudinal and transverse strips 2 and 3, secured to the upper face of the bottom or base and forming an upwardly projecting marginal flange. The bottom or base 1, which may be of any preferred construction, is preferably reinforced at its upper face by transverse cleats 4, spaced from the center of the coop and preferably rounded at their upper faces. The bottom has hinged to it foldable side walls 5, composed of longitudinal slats 6 and vertical posts or standards 7 and 8, arranged at the center and ends of the side walls. The posts or standards 7 and 8 of the side walls are connected with the bottom by longitudinal pintle rods 9, mounted in longitudinally alined eyes 10, preferably consisting of staples driven into the bottom and projecting from the upper face thereof, but any other form of eye may, of course, be employed. The longitudinal pintle rods 9, which are spaced from the inner faces of the longitudinal strips 2, are each provided with a central upwardly extending approximately U-shaped loop 11, and terminal upwardly extending arms 12, secured by staples or other suitable fastening means to the inner faces of the posts or standards of the side walls. The longitudinal pintle rods are arranged in spaced relation with the side strips to permit the side walls to fit flat against the inner faces of the side strips when the former are arranged in a vertical position, and also to permit an intervening space between the side walls and the side strips 2 when the former are folded, as clearly illustrated in Fig. 3 of the drawings. The bottom or base also carries foldable end walls 13, consisting of horizontal slats 14 and vertical posts or standards 15 and 16, located at the centers and ends of the side walls and rounded at their lower terminals at 17 and 18 to permit the foldable ends to swing downwardly on transverse pivot bolts 19. The transverse pivot bolts 19, which are arranged in a plane above the longitudinal pintle rods, pierce the lower ends of the posts 16 and the side strips 2.

The coop may be made of any desired size, and while the side and end walls are shown in the drawings, as composed of top and bottom slats and connecting posts, any number of such slats may, of course, be employed. The bottom slats of the side and end walls fit flat upon the upper edges of the side and end strips of the bottom when the said walls are arranged in a vertical position for use.

When the coop is set up for use, the side walls fit between the end posts of the end walls and lock the latter in an upright position. The side walls are firmly held in an upright position by a central transverse partition 20, composed of top and bottom slats 21 and 22, and central and end posts or standards 23 and 24. The partition is hinged to the base by means of a transverse pintle rod 25, arranged in transversely alined bearing eyes 26 and provided with a central loop 27 and terminal arms 28, the loop and the arms being stapled or otherwise secured to one of the side faces of the bottom slat 22 of the partition. The partition is adapted to swing upwardly and downwardly and it is securely held in an upright position between the central posts or standards of the side walls by means of clips 27$^a$ of a top or cover 28$^a$, composed of spaced longitudinal and transverse slats or bars. The clips 27$^a$, which are secured to the lower face of a central transverse bar 29 of the top or cover, consist of metallic plates provided with spaced depending lugs adapted to engage the end portions of the transverse partition at the opposite faces thereof. The partition and the clips are centrally arranged and the latter are adapted to engage the former when the top or cover is placed on the coop with either of its ends at either end of the coop.

The top or cover, when arranged upon the upper edges of the side and end walls, is interlocked with the latter by means of projections 30, consisting of extensions of the end posts or standards of the side walls and engaging the inner edges of transverse end bars or cleats 31 of the top of the coop. This interlocks the top against longitudinal movement, and the said top is locked against lateral movement by means of spaced blocks 32, arranged in pairs and secured to the lower faces of the end bars or cleats 31 at opposite sides of the centers thereof, and arranged to engage the central posts or standards 15 at opposite sides of the upper ends thereof.

The top is locked in position by means of side locking devices 33, consisting of longitudinal rods or shafts mounted in longitudinally alined bearing eyes 34 at the inner side edges of side slats 35 of the top, and provided with a central loop 36 and terminal arms 37. The terminal arms 37, which are located at the end edges of the removable top, are provided with terminal engaging portions 38, forming hooks and adapted to extend through eyes 39 of the foldable end walls when the coop is arranged for use, and also through eyes 40 of the end strips 3 when the coop is collapsed, whereby the top is locked in either of its positions. The central loops 36 are locked flat against the upper face of the central bar 29 of the top of the coop by means of pivoted snap hooks 41, which are adapted to engage staples 42, mounted on the central bar 29 and arranged to pass through the loops 36. The pivoted hooks extend from the loops in engaging the staples and they securely confine the side locking devices in their locked position.

The side and end walls, the central partition, and the top of the coop are preferably equipped with wire netting 43 for covering the space between the slats or bars, but the wire netting may be omitted when unnecessary. The top is provided with a central longitudinal slidable slat 44 mounted in end guides 45 consisting of metallic straps bent to form loops for embracing the central slat and secured at their terminals to the end transverse bars 31. The slat is movable longitudinally in either direction to afford access to the space or compartment at either side of the central transverse partition, and the said slat 44, which constitutes a door, is locked against movement in either direction by means of a central locking device consisting of a central transverse shaft or pivot 46, mounted in suitable bearing eyes 47 of a central transverse bar 29 at the upper faces thereof and provided with a central clamping loop 48 and an operating arm 49. The clamping loop 48 arches the central slat, and the operating arm, which is resilient, extends longitudinally of one of the intermediate slats 50 of the top of the coop and is adapted to be sprung into and out of engagement with a hook-shaped keeper 51, which confines the central locking device in engagement with the slidable slat. When the operating arm of the central locking device is disengaged from the keeper, it is adapted to swing upwardly to raise the loop out of engagement with the central slat 44.

In collapsing the coop, the top is first removed and the central transverse partition is swung downwardly and inwardly against the bottom. The slats of the partition are of substantially the thickness of the transverse cleats 4, so that the central and end posts or standards of the partition are supported above and extend over the adjacent cleat 4. The downward swinging of the central partition releases the side walls, which are folded inwardly over the partition, the slats of the side walls being arranged between the central and end posts or standards of the partition and having their upper faces arranged in substantially the same plane as the upper faces of the said posts or standards. The end walls are next swung inwardly over the terminal portions of the side walls. The end posts or standards of the end walls fit in the spaces between the side walls and the side strips 2 of the bottom, and the central posts or standards are arranged in the spaces between the folded side walls. The top is then replaced on the folded body of the coop and is interlocked therewith against transverse movement by the blocks 32, which are then arranged at opposite sides of the rounded end of the central posts or standards of the folded end walls. The side locking devices securely retain the top in such interlocked relation.

While the invention is shown in the form of a coop in the accompanying drawings, the improvements may be advantageously employed in various other forms of shipping crates or receptacles.

What is claimed is:—

1. A collapsible receptacle of the class described including a bottom provided with marginal upwardly projecting side and end strips, foldable side walls hinged to the bottom at points spaced from the side strips and arranged to swing upwardly against the same and downwardly at points spaced from the same, foldable end walls having pivotally mounted end posts or standards foldable downwardly into the spaces between the folded side walls and the side strips, and a top.

2. A collapsible receptacle of the class described including a bottom having side strips, said bottom being provided with bearing eyes spaced from the side strips, foldable side walls, longitudinal pintle rods mounted in the bearing eyes of the bottom and provided intermediate of their ends with loops and having terminal arms, said loops and arms being secured to the foldable side walls at the inner faces thereof, and foldable end walls pivotally connected with the bottom and having end posts or standards arranged to swing downwardly between the folded side walls and the side strips.

3. A collapsible receptacle of the class described including a bottom, foldable side walls hinged to the bottom at points spaced from the side edges thereof, and a foldable transverse partition, said walls and partition being composed of posts or standards and connecting slats, the posts or standards of the partition being spaced to receive between them the slats of the side walls and the posts or standards of the end walls being arranged beyond the side walls and supporting the slats of the end walls above the side walls when the said end walls are folded.

4. A collapsible receptacle of the class described including a bottom, foldable side and end walls carried by the bottom, the side walls being provided with upwardly extending projections and the end walls having central posts, a top arranged upon the upper edges of the side and end walls and engaging the projections of the side walls, said top being also provided at its inner face with spaced projections arranged in pairs and engaging the central posts of the ends at opposite sides thereof when the said end walls are folded or arranged in an upright position.

5. A collapsible receptacle of the class described including a base provided with alined bearing eyes, a foldable member, a pintle rod mounted in the bearing eyes and provided with terminal arms and having an intermediate loop, and means for securing the arms and the loop to the said member for hinging the latter to the bottom.

6. A receptacle of the class described including a top provided with a longitudinally slidable slat movable in either direction to afford access to the interior of the receptacle, a locking device consisting of a pivot having a clamping loop arching the slidable slat and arranged to engage the same, a resilient operating arm adapted to swing the loop into and out of engagement with the slat, and a keeper arranged to be engaged by the operating arm.

7. In combination with a coop or crate having a movable slat, a locking device consisting of a transverse shaft, bearings on the coop or crate in which said shaft is mounted, said bearings being located at opposite sides of the slat, said shaft having a clamping loop between the bearings, said loop straddling the slat and adapted to engage the same when the shaft is moved in one direction, a resilient operating arm connected to one end of the shaft, and a keeper for the operating arm to hold the loop in engagement with the slat.

In testimony that I claim the foregoing as my own, I have hereto affixed my signature in the presence of two witnesses.

JOHN C. BLEDSOE.

Witnesses:
  A. J. SAMUELSON,
  D. E. SCHUMANN.